US007407143B1

(12) United States Patent
Chen

(10) Patent No.: US 7,407,143 B1
(45) Date of Patent: Aug. 5, 2008

(54) COMMUNICATION DEVICE HOLDER FOR VEHICLES

(75) Inventor: Jeong-Shiun Chen, Zhonghe (TW)

(73) Assignee: Supa Technology Co., Ltd., Taipei Hsien (TW)

(*) Notice: Subject to any disclaimer, the term of this patent is extended or adjusted under 35 U.S.C. 154(b) by 0 days.

(21) Appl. No.: 11/761,460

(22) Filed: Jun. 12, 2007

(51) Int. Cl.
*A47F 5/00* (2006.01)

(52) U.S. Cl. ............... 248/309.1; 248/316.4; 379/446; 379/455

(58) Field of Classification Search ............ 248/309.1, 248/316.1, 316.4, 316.2, 229.12, 229.22, 248/231.41; 224/926; 379/446, 455; 455/569.2, 455/575.9, 90.3, 575.1, 575.3, 575.4
See application file for complete search history.

(56) References Cited

U.S. PATENT DOCUMENTS

| | | | | |
|---|---|---|---|---|
| 5,438,936 A * | 8/1995 | Wang | | 108/44 |
| 5,457,745 A * | 10/1995 | Wang | | 379/454 |
| 5,555,302 A * | 9/1996 | Wang | | 379/446 |
| 5,788,202 A * | 8/1998 | Richter | | 248/316.4 |
| 5,836,563 A * | 11/1998 | Hsin-Yung | | 248/316.4 |
| 5,903,645 A * | 5/1999 | Tsay | | 379/455 |
| 6,951,629 B2 * | 10/2005 | Kronseder | | 264/532 |
| 6,959,899 B2 * | 11/2005 | Yeh | | 248/346.03 |
| 2007/0262223 A1 * | 11/2007 | Wang et al. | | 248/346.07 |

FOREIGN PATENT DOCUMENTS

TW 093207930 5/2005

* cited by examiner

*Primary Examiner*—Ramon O Ramirez
(74) *Attorney, Agent, or Firm*—Rabin & Berdo, P.C.

(57) ABSTRACT

A communication device holder for vehicles includes an upper cover and a lower cover cooperating with the upper cover; a left wing member and a right wing member, which are horizontally displaceable, are disposed in between the upper cover and the lower cover; one end of the left wing member is formed with at least one clamping jaw, and the other end of the left wing member is formed with a horizontal rack; one end of the right wing member is formed with at least one clamping jaw, and the other end of the right wing member is formed with the horizontal rack and at least one raised portion, and the raised portion is connected with a post formed on the upper cover through a spring; the spring pushes the right wing member to displace towards the outside of the upper cover.

7 Claims, 6 Drawing Sheets

COMMUNICATION DEVICE HOLDER FOR VEHICLES

BACKGROUND OF THE INVENTION

1. Field of the Invention

The present invention is generally related to a communication device holder, and in particular, to a communication device holder for vehicles.

2. The Prior Arts

Nowadays, people are using digital electronic products like cell phones and PDAs in many more occasions, such as in an office, a home or in a car. When these electronic products are used in the home or in the office, they can be placed in a convenient and safe place for future use; however, it will be very dangerous when these electronic products are placed haphazardly in a car after use, especially due to changes in road conditions and car movements, these electronic terminals could be displaced to some corners to affect the driving safety.

To solve the aforementioned problem, some clamping holders for holding the electronic products have appeared on the market, whose principle of clamping or holding is to adopt a holder of a specific designated shape for fixing the electronic products, thereby preventing the electronic products from displacement. Referring to FIG. 1, the Taiwanese patent application No. 093207930 discloses a communication device holder for vehicles in which the surface of the clamping holder is formed with clamping bars having a permanent shape at the two sides, and the communication device can be prevented from displacement inside the car when it is received within the clamping bars. Nevertheless, these kinds of clamping holders are only usable for holding communication devices which have compatible sizes to the clamping holders, which means that, if the communication devices have larger or smaller sizes than the clamping holder, they are either unable to be received or unable to be held tightly, thereby failing to hold the communication devices effectively.

SUMMARY OF THE INVENTION

An objective of the present invention is to provide a communication device holder for vehicles, which has a simpler structure and is easier to use, and can effectively clamp a communication device inside the communication device holder for vehicles.

The communication device holder for vehicles according to the present invention comprises an upper cover and a lower cover in cooperation with the upper cover; a left wing member and a right wing member, which are horizontally displaceable, are disposed between the upper cover and the lower cover; one end of the left wing member is formed with at least one clamping jaw and the other end is formed with horizontal rack; one end of the right wing member is formed with at least one clamping jaw, and the other end is formed with horizontal rack; and the other end is disposed with at least one raised portion; and at least one raised portion is connected with a post formed on the upper cover through a spring; the spring stretches the right wing member to displace towards the outside of the upper cover.

The horizontal racks of the left wing member and the right wing member are meshed with the two corresponding sides of a gear pivoted on the upper cover, respectively.

The gear is coaxially disposed with a ratchet wheel; and the ratchet tooth is coupled to a clamping pawl, which can be horizontally displaceable. When the ratchet wheel and the clamping pawl are coupled, the gear stops driving the left wing member and the right wing member from moving towards the outside of the upper cover.

The upper cover of the communication device holder for vehicles according to the present invention is formed with a plurality of horizontal guide rails for sliding of the left wing member and the right wing member in them.

The ends of the left wing member and the right wing member according to the present invention are formed with a plurality of guide grooves for fasten the clamping jaws.

The lower portion of the upper cover according to the present invention is formed with a guide groove for fastening the clamping jaw.

The clamping jaw according to the present invention comprises a rubber cap, a screw bolt fastened in the rubber cap, and a screw cap cooperating with the screw bolt. The screw bolt passes through the guide groove to be secured using the screw cap.

The ratchet wheel is secured to a button. One end of the button is protruded outside of the body of the upper cover; and a compression spring is disposed between the other end and the upper cover for biasing the ratchet wheel teeth close to the clamping pawl.

The surface of the upper cover according to the present invention is formed with a pad.

The space in between the clamping pawls of the present invention is adjustable for facilitating usage flexibility. In addition, when the communication device is received in the clamping holder, by adjusting the space in between the clamping pawls, the communication device can be fixedly clamped tightly and effectively.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
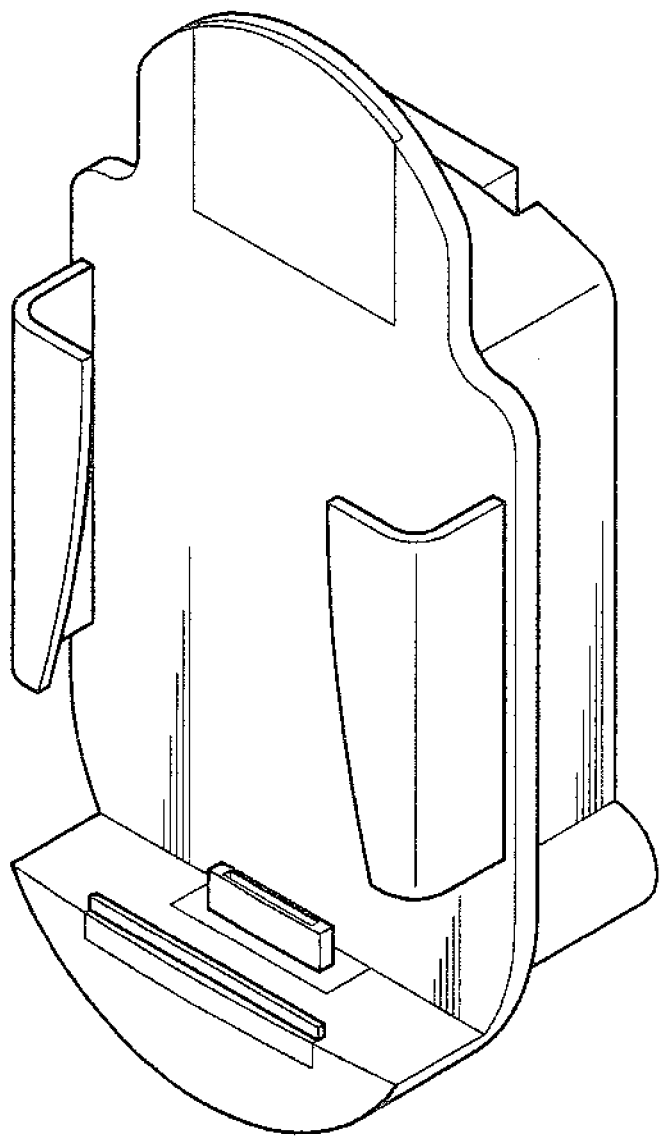
FIG. 1 is a schematic view showing the structure of a traditional communication device holder for vehicles.
Figure 2:
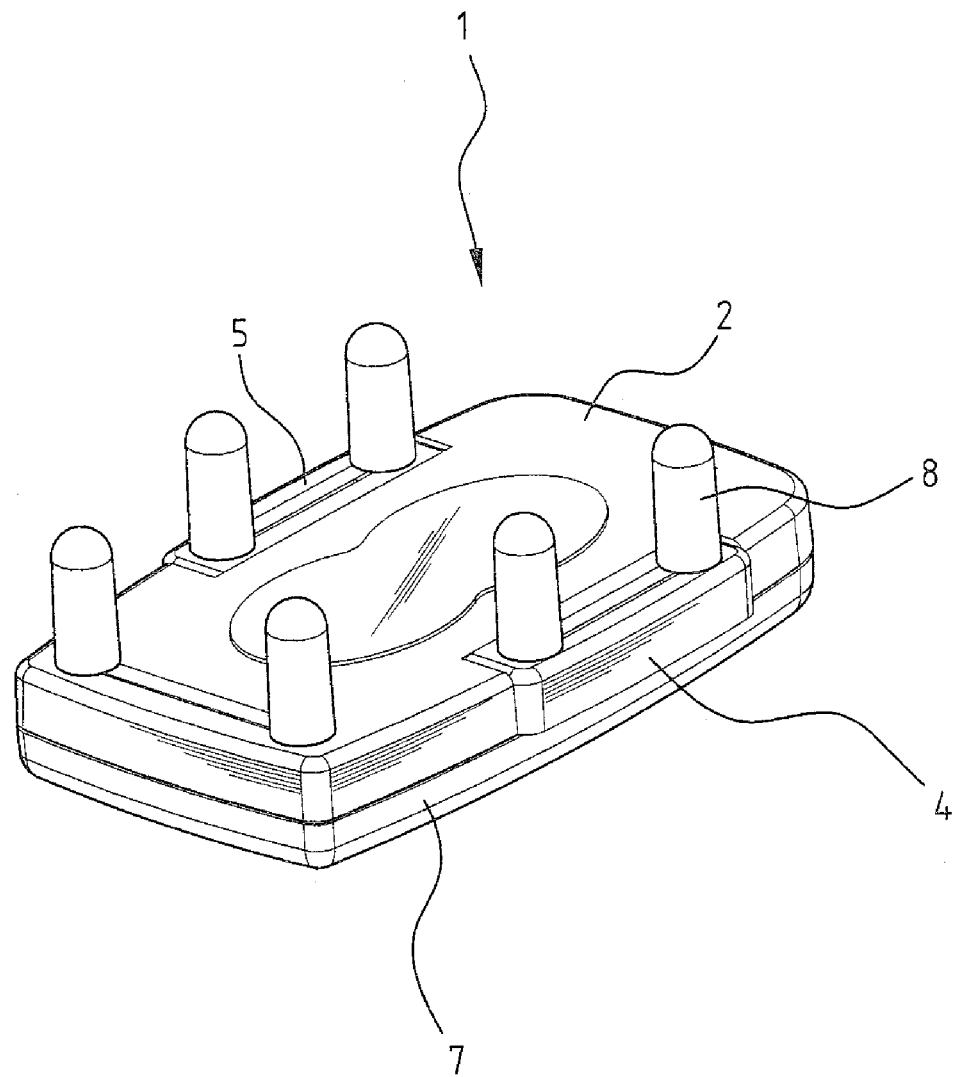
FIG. 2 is a perspective view showing the appearance of the present invention.
Figure 3:
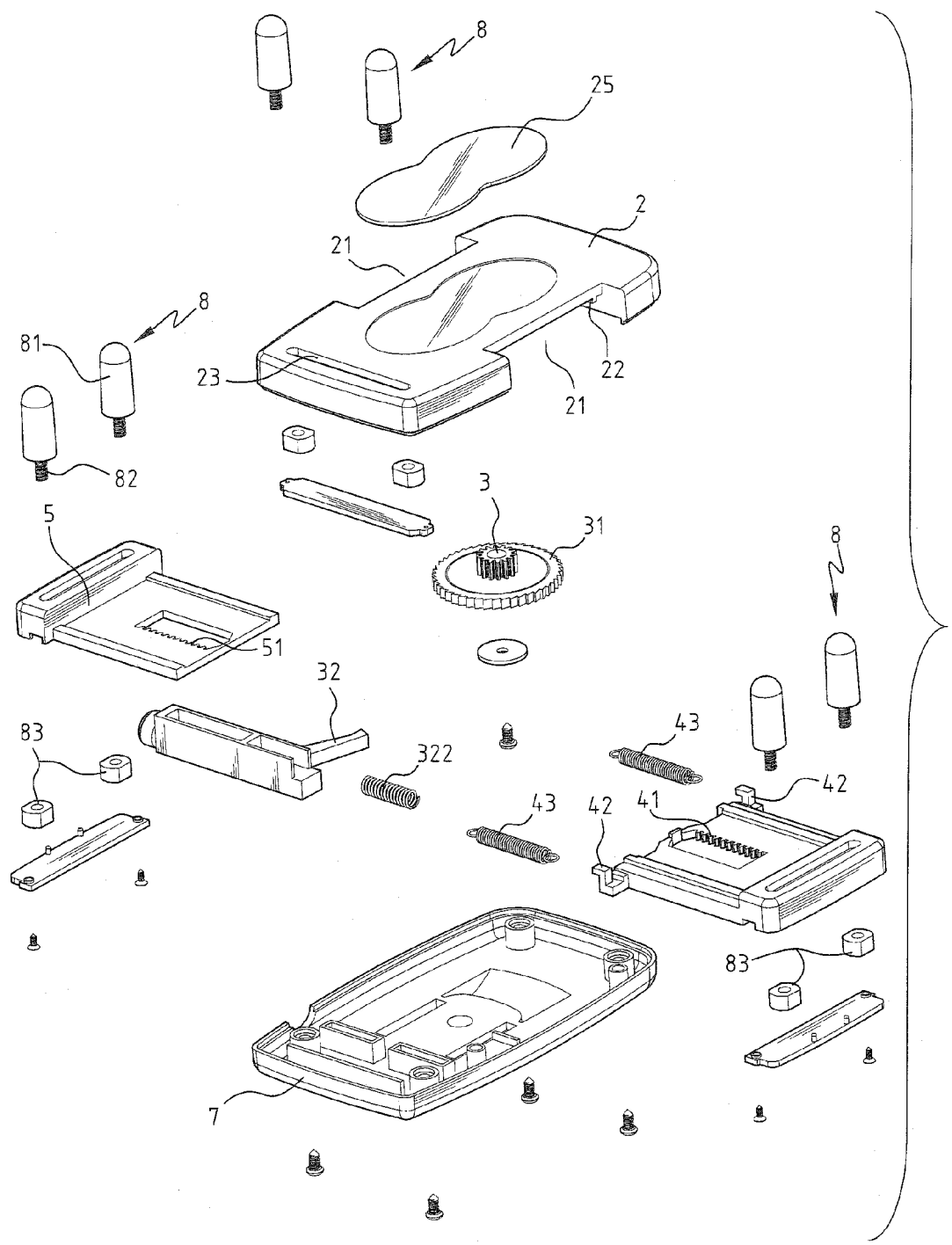
FIG. 3 is a perspective exploded view showing the assembly of a plurality of main parts of the present invention.
Figure 4:
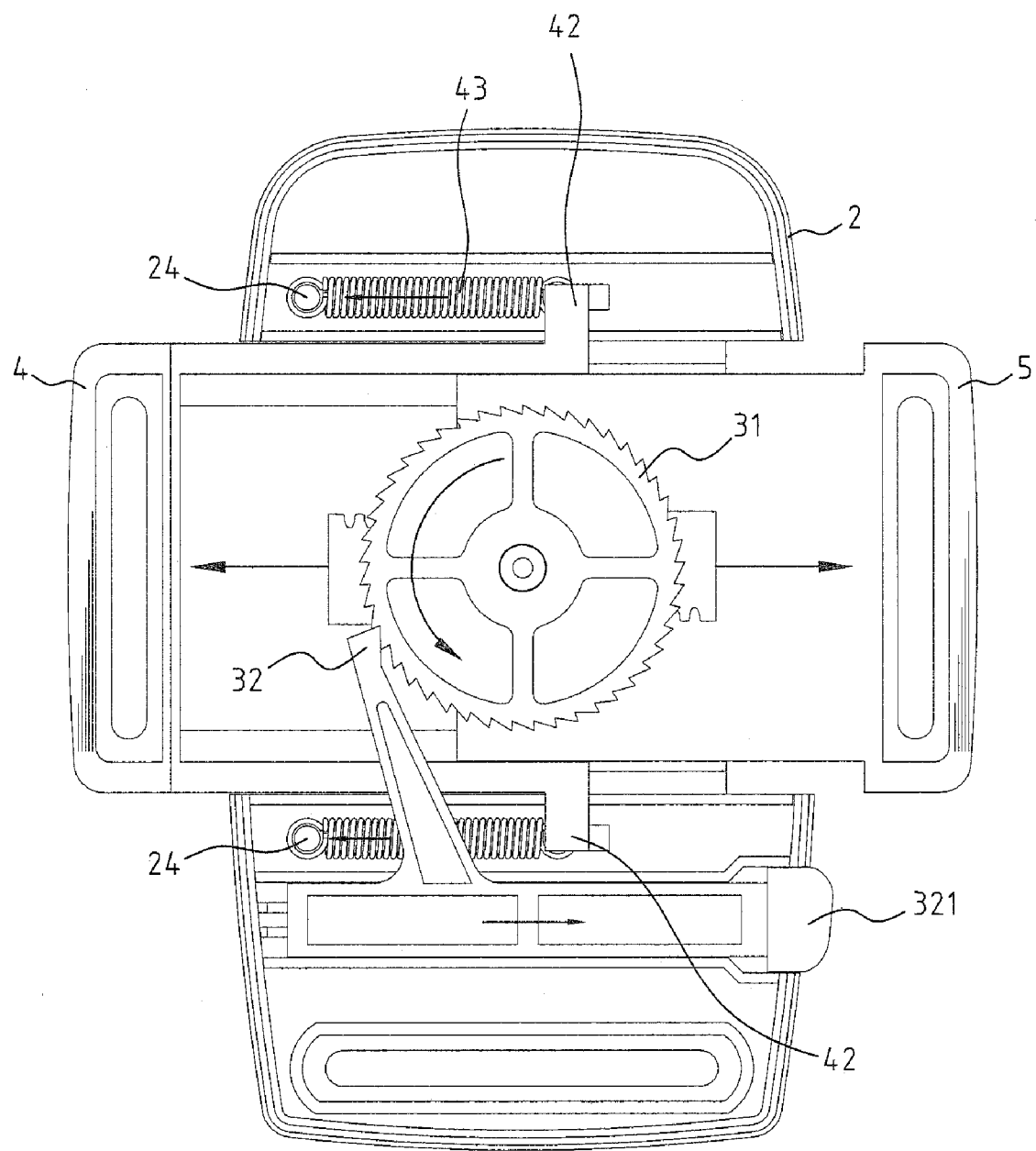
FIG. 4 is a plan cross-sectional view showing the inner structure of the present invention as viewed from a first direction.
Figure 5:
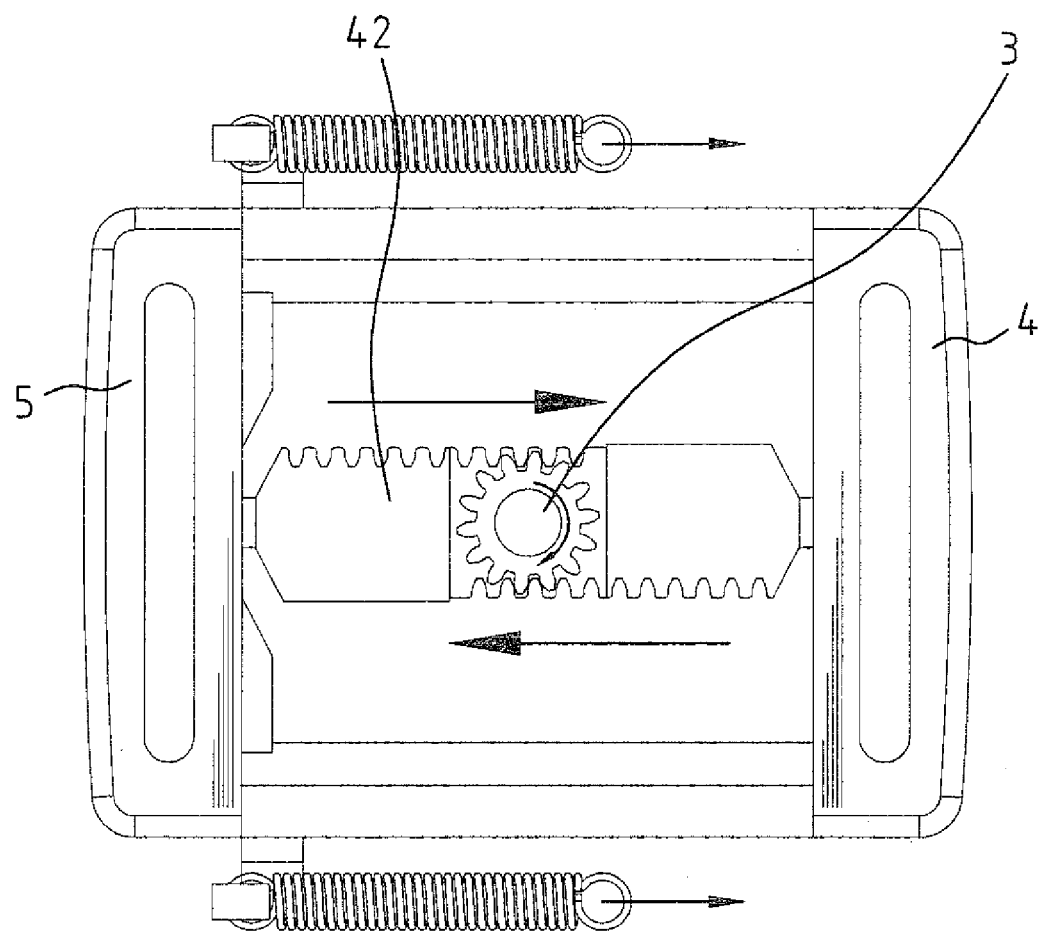
FIG. 5 is a plan cross-sectional view showing the inner structure of the present invention as viewed from a second direction.

Referring to FIGS. 3-5, a preferred embodiment of the communication device holder for vehicles 1 according to the present invention comprises an upper cover 2 and a lower cover 7 cooperating with the upper cover 2. The upper cover 2 and the lower cover 7 are sealed to form an internal space.

The two sides of the upper cover 2 are formed with a plurality of openings 21, respectively. A left wing member 5 and a right wing member 4 are inserted into the inside of the upper cover 2 via the openings 21. To ensure the stability of the horizontal movement of the left wing member 5 and the right wing member 4 in between the upper cover 2 and the lower cover 7, a plurality of guide rails 22 are provided at the contact region between the upper cover 2 and the left wing member 5 and the right wing member 4, thereby making the left wing member 5 and the right wing member 4 to move horizontally inside the frame formed by the guide rails 22 to improve the stability.

Each end of the left wing member 5 and the right wing member 4 disposed outside of the upper cover 2 is formed with at least one clamping jaw 8, which is used for clamping the communication device. In this embodiment, the lower portion of the upper cover 2 also can be provided with at least one clamping jaw 8 to clamp the communication device.

Figure 6:
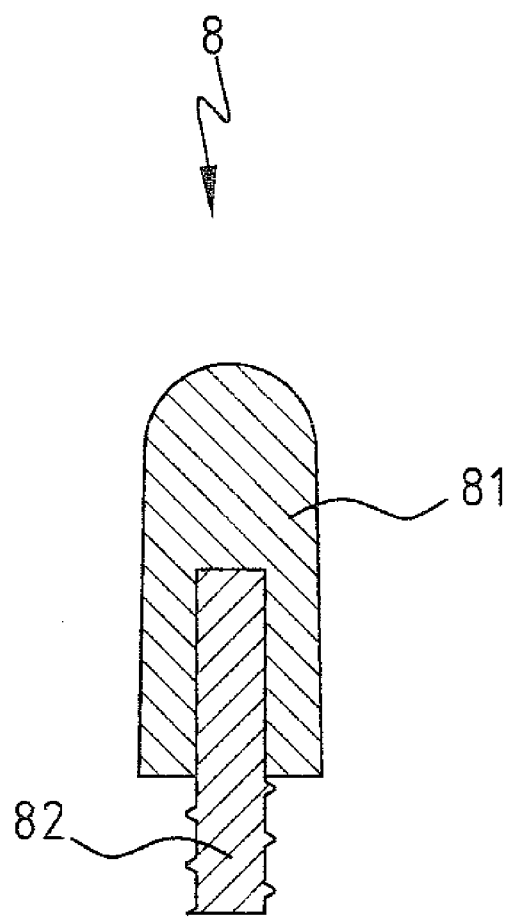
FIG. 6 is a plan cross-sectional view showing the structure of a clamping jaw constructed in accordance with the present invention.

The clamping jaw 8 can be fastened at the end portion of the left wing member 5 or the right wing member 4, and in a guide groove 23 formed at the lower portion of the upper cover 2. Referring to FIG. 6, the clamping jaw 8 according to the present invention comprises a rubber cap 81, a screw bolt 82 fastened in the rubber cap 81, and a screw cap 83 cooperating with the screw bolt 82. During the process of fastening, the screw bolt 82 is passed through the guide groove 23 to be secured by the screw cap 83, so that the screw cap 83 and the rubber cap 81 are to clamp the upper and lower surfaces of the guide groove 23 tightly to secure the clamping jaw 8 inside the guide groove 23.

The upper cover 2 is provided with a pivotally-connected gear 3 inside, which has a ratchet wheel 31 on the upper surface of the gear 3, and the ratchet wheel 31 and the gear 3 are coaxially-fastened.

The left wing member 5 is formed with a horizontal rack 51 at one end inside of the upper cover 2, and the right wing member 4 is also formed with a horizontal rack 41 at one end inside of the upper cover 2. Each horizontal rack 41, 51 is disposed at two sides of the gear 3, respectively, and is engaged or meshed with the gear 3, respectively. Referring to FIG. 5, when the ratchet wheel 31 rotates clockwise, the coaxially-fastened gear 3 is to rotate clockwise as well, which then brings about the left wing member 5 and right wing members 4 to move horizontally towards the inside of the upper cover 2, since the gear 3 is engaged or meshed with both horizontal racks 41, 51; accordingly, if the ratchet wheel 31 rotates counterclockwise, the left wing member 5 and the right wing member 4 are to move horizontally towards the outside of the upper cover 2.

A clamping pawl 32 is further provided inside of the upper cover 2 configured to be coupled to the ratchet tooth of the ratchet wheel 31. In addition, the clamping pawl 32 can be horizontally displaceable. When contacting with the clamping pawl 32, the ratchet wheel 31 can only rotate clockwise rather than counterclockwise; that is, the left wing member 5 and right wing member 4 can only move horizontally towards the inside of the upper cover 2. When the clamping pawl 32 disengages with or separate from the ratchet wheel 31, the ratchet wheel 31 is able to rotate freely, thereby making the left wing and right wing members 5, 4 to move freely horizontally.

The communication device holder for vehicles 1 according to the present invention is able to automatically adjustably adapt to the clamping dimensions for a plurality of communication devices having different sizes and configurations. That is, the right wing member 4 is formed with a raised portion 42 on one end disposed inside the upper cover 2. In addition, the right wing member 4 can be formed with two raised portions 42 as illustrated in FIG. 3. The left side of the upper cover 2 is formed with a post 24, and the post 24 is to be of the same quantity as the raised portion 42. A spring 43 is provided and is connected between the post 24 and the raised portion 42; and while in the extension state, the spring 43 exerts a force to the right wing member 4 towards the outside of the upper cover 2. Due to the meshing between the horizontal rack 41 and the gear 3; therefore, the gear 3 is to rotate counterclockwise, which is to bring the left wing member 5 to move towards the outside of the upper cover 2.

When the communication device holder for vehicles 1 according to the present invention is in use for clamping the communication device, the clamping pawl 32 is first disengaged or separated from the ratchet wheel 31. Here, by means of the elastic force of the spring 43, the left wing member 5 and the right wing member 4 are to move horizontally towards the outside of the upper cover 2; then the communication is placed inside the space as confined by the clamping jaws 8, and the left wing member 5 and the right wing member 4 are pushed together until each clamping jaw 8 comes into contact with the communication device; then the clamping pawl 32 is to be coupled or meshed to the ratchet tooth of the ratchet wheel 31, thereby restricting the ratchet wheel 31 from rotating counterclockwise and the left wing member 5 and the right wing member 4 from moving towards the outside of the upper cover 2. When the communication device is to be removed out of the grasps of the clamping jaws 8, the clamping pawl 32 and the ratchet wheel 31 are required to be disengaged or separated, and the left wing member 5 and the right wing member 4 are to move horizontally towards the outside of the upper cover 2, thus releasing the communication device.

According to this embodiment, one end of the clamping pawl 32 can be coupled to a button 321; the button 321 is to have an end exposed outside the upper cover 2; and the button 321 can horizontally slide along the guide groove inside the upper cover 2. A compression spring 322 can be provided between button 321 at one end inside of the upper cover 2 and inside the body of the upper cover 2 to impose an extension force onto the button 321, thereby making the clamping pawl 32 coupled to the button 321 to firmly engage the ratchet tooth of the ratchet wheel 31.

During the process of clamping the communication device, the button 321 is pushed, and the clamping pawl 32 is disengaged from the ratchet wheel 31. Here, by means of the extension force of the spring 43, the left wing member 5 and the right wing member 4 are to move horizontally outside of the upper cover 2. Then, the communication device is placed inside the space confined by the clamping jaws 8; and the left wing member 5 and the right wing member 4 are pushed together until each clamping jaw 8 contacts the communication device; then the button 321 is released, thereby restricting the ratchet wheel 31 from rotating counterclockwise, and correspondingly, the left wing member 5 and the right wing member 4 from moving outside of the upper cover 2 under the force exerted by the compression spring 322, thus the communicated device is clamped.

Furthermore, in this embodiment, the surface of the upper cover 2 is formed with a pad 25 made of rubber or other elastic material. With the help of the pad 25, the communication device can be held tightly in the communication device holder.

Although the present invention has been described with reference to the preferred embodiment thereof, it is apparent to those skilled in the art that a variety of modifications and changes may be made without departing from the scope of the present invention which is intended to be defined by the appended claims.

What is claimed is:

1. A communication device holder for vehicles, comprising:

an upper cover;

a lower cover, cooperating with and is coupled to the upper cover;

a left wing member and a right wing member, horizontally displaceable, and disposed between the upper cover and the lower cover;

a plurality of clamping jaws;

a plurality of horizontal racks;

at least one raised portion;

at least one post;

a spring;

a gear and a ratchet wheel having a plurality of teeth; and a clamping pawl, wherein one end of the left wing member is disposed with the clamping jaw and the other end of the left wing member is formed with the horizontal rack; and one end of the right wing member is disposed with the clamping jaw, and the other end of the right wing member is formed with the horizontal rack and also the raised portion is connected with the post formed on the upper cover through the spring; the spring pulls on the right wing member to displace towards the outside of the upper cover; and the horizontal racks of the left wing member and of the right wing member are meshed with two corresponding sides of the gear wherein pivotally coupled to the upper cover, respectively; and the gear is coaxially coupled with the ratchet wheel, and a tooth of the ratchet wheel is coupled to the clamping pawl, which is horizontally displaceable; and wherein the ratchet wheel and the clamping pawl are coupled, the gear stops driving the left wing member and the right wing member from moving towards the outside of the upper cover.

2. The communication device holder for vehicles as claimed in claim 1, wherein the upper cover is formed with a plurality of horizontal guide rails for the left wing member and the right wing member to slide in.

3. The communication device holder for vehicles as claimed in claim 1, wherein the ends of the left wing member and of the right wing member are each formed with a guide groove for fastening the clamping jaws.

4. The communication device holder for vehicles as claimed in claim 1, wherein a lower portion of the upper cover is formed with a guide groove for fastening the clamping jaw.

5. The communication device holder for vehicles as claimed in claim 3, wherein the clamping jaw comprises a rubber cap, a screw bolt fastened in the rubber cap, and a screw cap cooperating with the screw bolt, and the screw bolt is passed through the guide groove to be secured by the screw cap.

6. The communication device holder for vehicles as claimed in claim 1, wherein the ratchet wheel is secured to a button, and one end of the button is protruded outside of the body of the upper cover, and a compression spring is disposed between the other end and the upper cover for biasing the clamping pawl abutting to the ratchet tooth of the ratchet wheel.

7. The communication device holder for vehicles as claimed in claim 1, wherein the surface of the upper cover is formed with a pad.

* * * * *